(12) United States Patent
Lin et al.

(10) Patent No.: US 7,269,530 B1
(45) Date of Patent: Sep. 11, 2007

(54) WIRELESS TRANSMISSION METHOD FOR TIRE DETECTION SIGNALS

(75) Inventors: Chen-Wei Lin, Nantou (TW); Meng-Cheih Lu, Tanzih Township, Taichung County (TW) n

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 0 days.

(21) Appl. No.: 11/415,215

(22) Filed: May 2, 2006

(51) Int. Cl.
*G01L 17/00* (2006.01)
*G01P 7/00* (2006.01)

(52) U.S. Cl. .......... 702/141; 73/146; 73/146.2; 73/146.3; 73/146.4; 73/146.5; 340/438; 340/442; 702/138; 702/145

(58) Field of Classification Search ........ 73/146, 73/146.2, 146.3, 146.4, 146.5, 146.8; 340/438, 340/442, 446, 447, 448, 449; 702/138, 140, 702/141, 142, 145
See application file for complete search history.

(56) References Cited

U.S. PATENT DOCUMENTS

| | | | | |
|---|---|---|---|---|
| 2,417,940 A | * | 9/1947 | Lehman | 200/61.25 |
| 2,727,221 A | * | 12/1955 | Sprigg | 340/447 |
| 3,178,686 A | * | 4/1965 | Mills | 340/447 |
| 3,223,969 A | * | 12/1965 | Course | 340/447 |
| 6,275,148 B1 | * | 8/2001 | Takamura et al. | 340/442 |
| 6,963,274 B2 | * | 11/2005 | Saheki et al. | 340/447 |
| 2003/0156022 A1 | * | 8/2003 | Saheki et al. | 340/442 |
| 2006/0220805 A1 | * | 10/2006 | Thomas et al. | 340/426.33 |
| 2006/0220815 A1 | * | 10/2006 | Thomas | 340/447 |

FOREIGN PATENT DOCUMENTS

JP 2003-335115 A * 11/2003

\* cited by examiner

*Primary Examiner*—Edward R Cosimano
(74) *Attorney, Agent, or Firm*—Rosenberg, Klein & Lee

(57) ABSTRACT

A wireless transmission method for tire detection signals increases the percentage of successfully received tire detection signals received by the receiving unit and extends the usage life of batteries. A delay time for emitting the tire detection signals via the detection unit is calculated according to the acceleration of the tire. The operation time for one rotation of the tire is divided into several equal periods. Then, the tire detection signals are emitted to the receiving unit via a wireless transmission method.

12 Claims, 5 Drawing Sheets

WIRELESS TRANSMISSION METHOD FOR TIRE DETECTION SIGNALS

BACKGROUND OF THE INVENTION

1. Field of the Invention

The present invention relates to a method for transmitting detection signals. In particular, this invention relates to a wireless transmission method for tire detection signals.

2. Description of the Related Art

As technology develops, vehicle workmanship also improves. Except for improving the performance of vehicles to make drivers enjoy driving more, drivers also enjoy their time in a car via an ergonomics design and the addition of multimedia devices. In developing vehicle technology, a key issue is how to improve safety. Therefore, a variety of technologies that increase driving safety have been developed, such as an anti-lock braking system (ABS), and a transmission system of tire detection signal, etc.

The transmission system of tire detection signal allows the user to check the status of the tires when the vehicle system is moving by receiving tire detection signals, such as tire pressure. The transmission system of tire detection signal includes a plurality of detection units and a receiving unit. Each of the tires has a detection unit and the receiving unit is installed on the body of the vehicle system. Each of the detection units detects a corresponding tire pressure to generate a tire detection signal. The tire detection signal is transmitted to the receiving unit via a wireless transmission method. The receiving unit digitizes the received tire detection signal and displays the digitized tire detection signal on a display unit. Thereby, the user checks the tire pressure from the display unit.

Generally, detection units detect a corresponding tire pressure and tire detection signals are transmitted to a receiving unit via a wireless transmission method. However, because the structure of vehicles is different, it usually has a dead spot at a specified angle (such as 90 degrees) so that the receiving unit cannot receive exactly the tire detection signal. If the tire detection signals are emitted to the receiving unit per resolution and the tire is located at the dead spot, the receiving unit cannot receive exactly tire detection signals emitted from the detection unit. Therefore, the driver cannot monitor the tire pressure as they are driving their car. Driving safety is not guaranteed. In order to increase the percentage of tire detection signals received by the receiving unit, the number of emitting tire detection units from the detection unit is increased to several times per resolution. Although the above method can increase the percentage of receiving tire detection signals by the receiving unit, the usage life of batteries installed in the detection unit is decreased. Under this condition, if the speed of the vehicle is too fast or too slow, the receiving unit still cannot receive exactly the tire detection signals emitted from the detection unit.

SUMMARY OF THE INVENTION

One particular aspect of the present invention is to provide a wireless transmission method for tire detection signals. The method uniformly disposes the location for emitting tire detection signals when the tire is rotated one time so as to increase the percentage of received tire detection signals. The power consumption of the battery is thereby reduced.

The present invention provides a wireless transmission method for tire detection signals. When the vehicle system is moving, the detector set of the detection unit installed at the tire always detects the operation status of the tire to generate a status signal. The first processing unit deals with the status signal to generate a tire detection signal, and calculates a delay time for emitting tire detection signals from the signal transmitting terminal according to the received status signal. After the first processing unit generates the tire detection unit and the delay time, the method enters a loop for emitting tire detection signals to emit tire detection signals to the receiving unit via the signal transmitting terminal.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention is a wireless transmission method for tire detection signals. The method divides the time that it takes for a tire to rotate once into several equal periods. Then, the method uniformly emits the tire detection signals to the receiving unit via a wireless transmission method so as to increase the percentage of tire detection signals received by the receiving unit. The usage life of a battery which powers the receiving unit is also extended.

Figure 1:
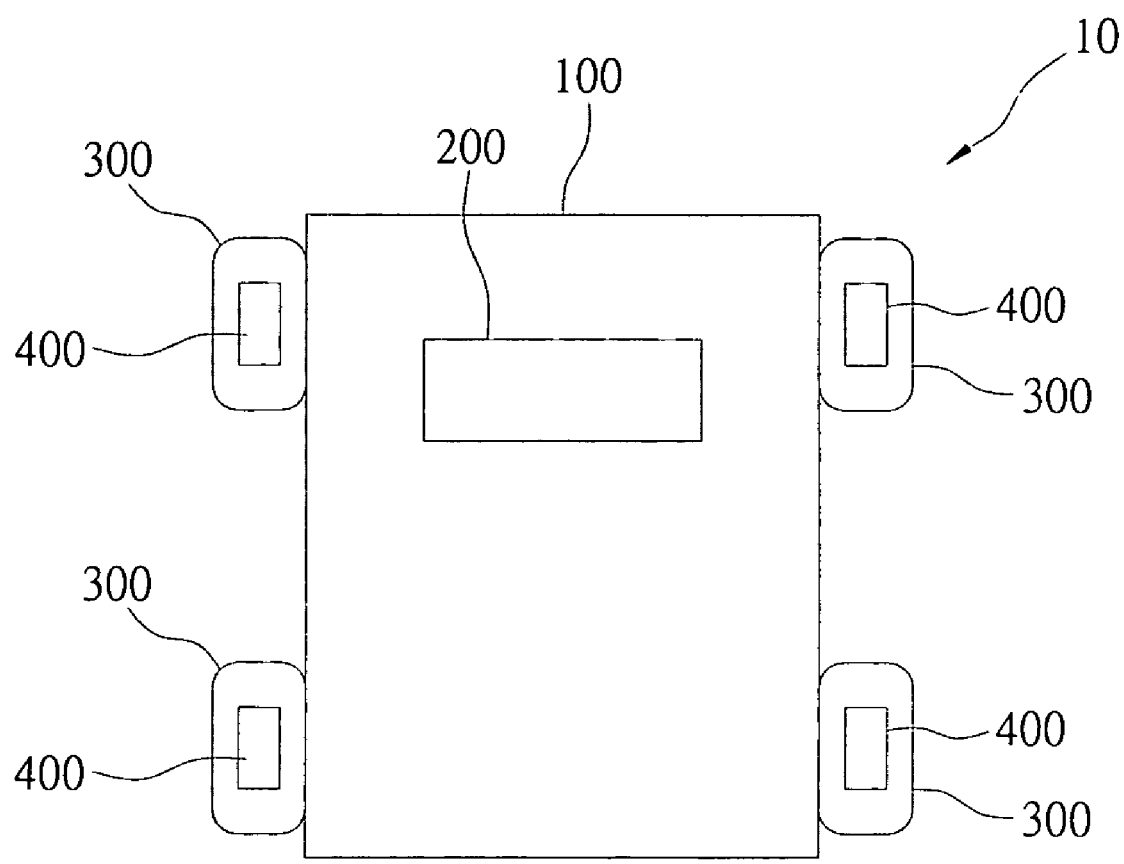
FIG. 1 is a schematic diagram of the vehicle system of the present invention.

Reference is made to FIG. 1, which shows a schematic diagram of a vehicle system of the present invention. The vehicle system 10 includes a car body 100, a tire detection signal transmission system, and a plurality of tires 300. The tire detection signal transmission system includes a receiving unit 200 and a plurality of detection units 400. In this embodiment, because a vehicle system having four tires 300 is taken as an example, the number of the detection units is also four.

The receiving unit 200 is installed in the car body 100 of the vehicle system 10 for receiving the tire detection signals emitted from the detection units 400. Then, the tire detection signals are displayed on a display unit (not shown in the figure) connected with the car body 100.

The detection units 400 are installed near the tires 300 of the vehicle system 10. When the vehicle system 10 is moving, the detection units 400 detects the operation status of the tires, such as tire pressure, temperature, and acceleration etc, to generate the tire detection signals and transmit the tire detection signals to the receiving unit 200 via a wireless transmission method.

Figure 2:
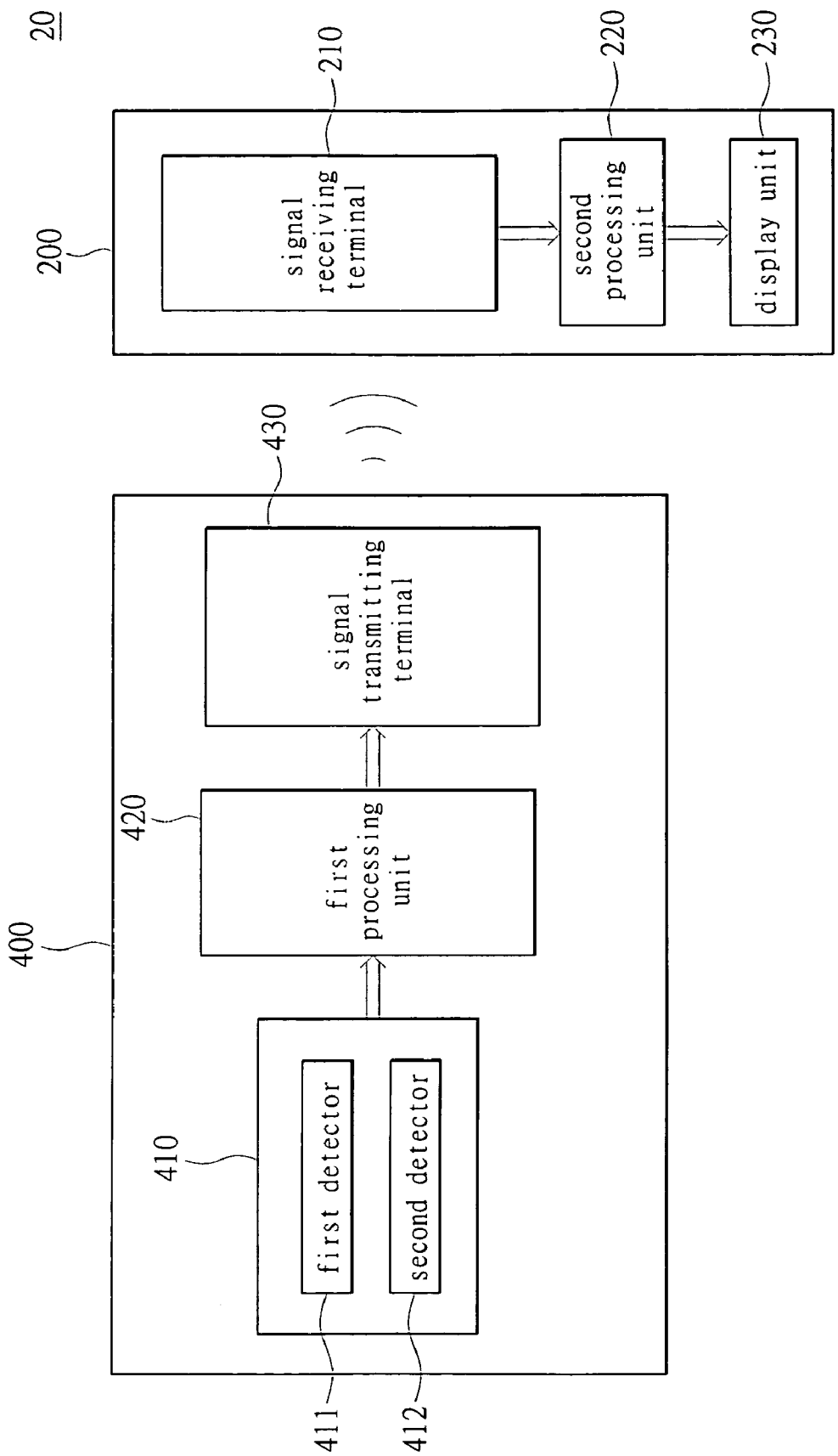
FIG. 2 is a block diagram of the tire detection signal transmission system of the present invention.

In order to illustrate the content more clearly, reference is made to FIG. 2. FIG. 2 shows a block diagram of the tire detection signal transmission system. The tire detection signal transmission system has a receiving unit 200 and a detection unit 400, as shown in FIG. 1. The tire detection signal transmission system 20 can be a tire pressure monitoring system (TPMS). The detection unit 400 includes a detector set 410, a first processing unit 420, and a signal transmitting terminal 430. The receiving unit 200 includes a signal receiving terminal 210, a second processing unit 220, and a display unit 230.

When the vehicle system 10 is moving, the detector set 410 is used for detecting the operation status of the tires 300, such as tire pressure, temperature, and acceleration etc, to generate a status signal.

In this embodiment, detecting the tire pressure and the tire acceleration is used as an example. The detector set 410 includes a first detector 411 and a second detector 412. The first detector 411 detects the tire pressure when the tire 300 is rotated. The first detector 411 is a tire pressure detector. The second detector 412 detects the tire acceleration when the tire 300 is rotated. The second detector 412 is an acceleration detector. Furthermore, the detector set 410 can includes other detectors, such as a temperature detector or a voltage detector etc, to increase the detection functions of the detection unit 400.

The first processing unit 420 is connected with the detector set 410 for receiving the status signal from the detector set 410, and processes the status signal to generate a tire detection signal and calculates a delay time for emitting the tire detection signal. The first processing unit 420 is a micro-controller unit (MCU).

The signal transmitting terminal 430 is connected with the first processing unit 420 and is controlled by the first processing unit 420 so as to emit the tire detection signal.

The signal receiving terminal 210 is used for receiving tire detection signals emitted from the signal transmitting terminal 430 and transmits tire detection signals to the second processing unit 220.

The second processing unit 220 is connected with the signal receiving terminal 210 for receiving tire detection signals inputted by the signal receiving terminal 210 to execute an operation so as to generate a data signal and transmit the data signal to the display unit 230. The second processing unit 220 is a micro-controller unit (MCU).

The display unit 230 is connected with the second processing unit 220 for receiving the data signal inputted by the second processing unit 220 and displaying the data signal on the display unit 230. Thereby, the user decides whether the operation status of the tire 300 is abnormal or not.

Figure 3:
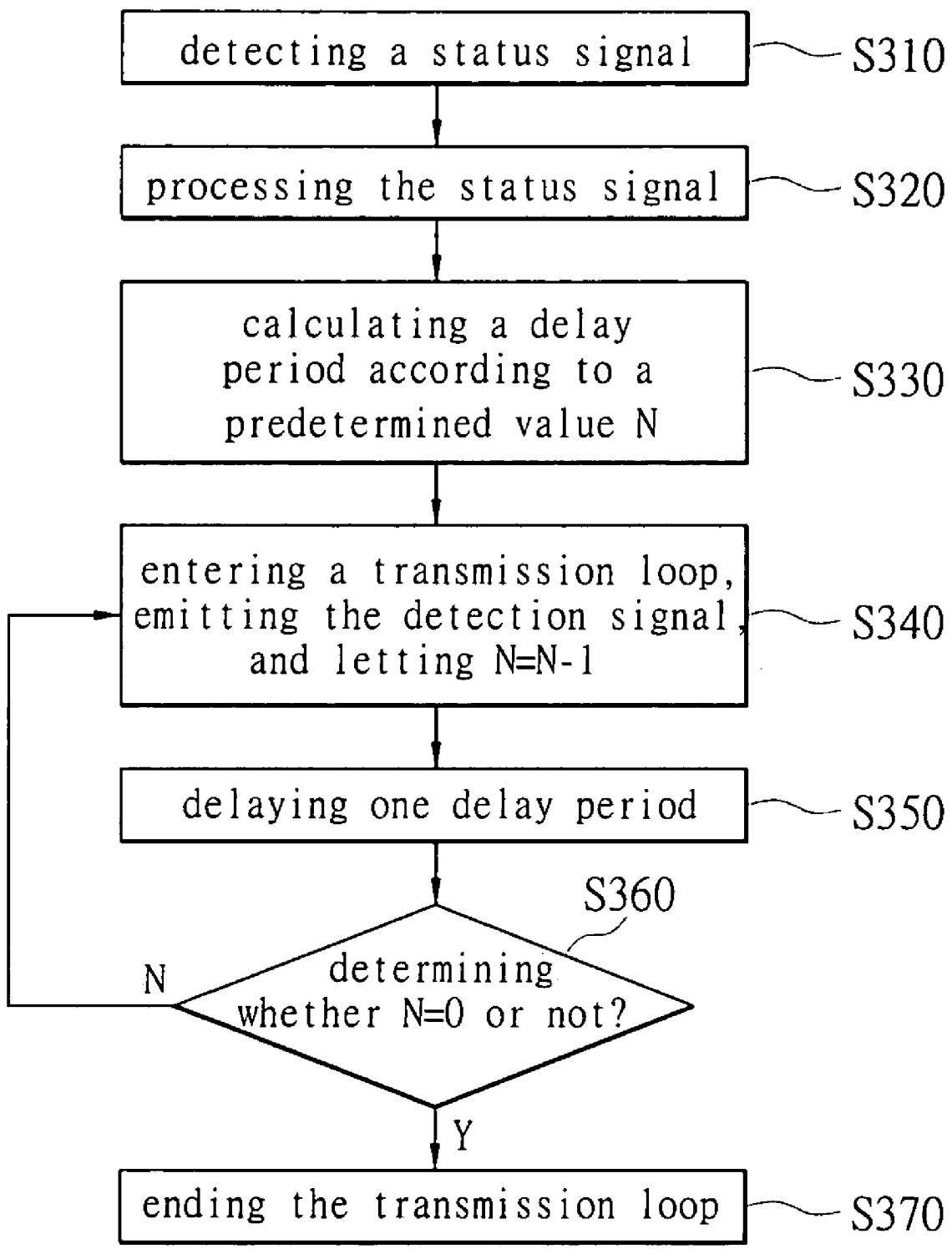
FIG. 3 is a flow chart of the wireless transmission method for tire detection signals of the present invention.

FIG. 3 is a flow chart of the wireless transmission method for tire detection signals of the present invention. When the vehicle system 10 is moving, the detector set 410 of the detection unit 400 installed at each of the tires 300 always detects the operation status of the tires 300, such as tire pressure and acceleration, to generate a status signal. The detector set 410 transmits the status signal to the first processing unit 420 in S310. The first processing unit 420 executes an operation to deal with the status signal inputted from the detector set 410 to generate a tire detection signal in S320. The first processing unit 420 calculates a delay time for emitting tire detection signals from the signal transmitting terminal 430 according to the received status signal and a predetermined emitting number N, in S330. After the first processing unit 420 generates tire detection signals and the delay time, the method enters a transmission loop for emitting tire detection signals to emit tire detection signals via the signal transmitting terminal 430 and let N=N−1, in S340. In the transmission loop, the first processing unit 420 automatically delays a delay time after tire detection signals are emitted, in S350. When the first processing unit 420 transmits tire detection signals to the signal receiving terminal 210 of the receiving unit 200 via the signal transmitting terminal 430, the first processing unit 420 determines whether the N in the transmission loop is equal to zero or not. This means that tire detection signals have been emitted from the detection unit 400, in S360. When the first processing unit 420 has not yet emitted all of the tire detection signals, S340 is repeated to emit tire detection signals to the signal receiving terminal 210. When the first processing unit 420 emits all of the tire detection signals during one rotation of the tire, the first processing unit 420 ends the emitting operation in this transmission loop. Until the tire is rotated again, the first processing unit 420 enters the transmission loop again to emit the detection signal, in S370.

When the second processing unit 220 in the receiving unit 200 receives tire detection signals emitted from the signal transmitting terminal 430 in the detection unit 400, the second processing unit 220 executes an operation for the received tire detection signal to generate a data signal. Then, the second processing unit 220 displays the data signal on the display unit 230. Thereby, the user can determine whether the operation status of the tire 300 is abnormal or not.

In order to illustrate the present invention clearly, in this embodiment, the present invention utilizes the acceleration detected by the second detector 412 to calculate the delay time for emitting tire detection signals from the signal transmitting terminal 430.

When the vehicle system 10 is moving, the detector set 410 of the detection unit 400 installed at each of the tires 300 always detects the operation status of the tires 300, such as tire pressure and acceleration, to generate a status signal. The first detector 411 of the detector set 410 detects the tire pressure when the tire is rotated and the second detector 412 detects the acceleration when the tire is rotated. The detector set 410 transmits the status signal to the first processing unit 420, in S310. The first processing unit 420 executes an operation to deal with the status signal inputted from the detector set 410. This means that the first processing unit 420 executes an operation to deal with the tire pressure of the tire 300 detected by the first detector 411 and the acceleration of the tire 300 detected by the second detector 412 to generate a tire detection signal, in S320. The first processing unit 420 calculates a delay time for emitting tire detection signals from the signal transmitting terminal 430 according to the received status signal and a predetermined emitting number N. This mean the method utilizes the acceleration of the tire 300 detected by the second detector 412 to calculate the speed of the vehicle system 10 so as to obtain the operation time of the tire 300 through one rotation. The delay time is calculated according to the operation time of the tire 300 through one rotation, the emitting number, and the emitting time for emitting tire detection signals via the detection unit 400, in S330. After the first processing unit 420 generates tire detection signals and the delay time, the method enters a transmission loop for emitting tire detection signals to emit tire detection signals via the signal transmitting terminal 430 and let N=N−1, in S340. In the transmission loop, the first processing unit 420 automatically delays a delay time after the tire detection signals are emitted, in S350. When the first processing unit 420 transmits tire detection signals to the signal receiving terminal 210 of the receiving unit 200 via the signal transmitting terminal 430, the first processing unit 420 determines whether the N in the transmission loop is equal to zero or not. This means that tire detection signals have been emitted from the detection unit 400, in S360. When the first processing unit 420 has not yet emitted all of the tire detection signals, S340 is repeated to emit tire detection signals to the signal receiving terminal 210. When the first processing unit 420 emits all of the tire detection signals during one rotation of the tire, the first processing unit 420 ends the emitting operation in this transmission loop. Until the tire is rotated once more, the first processing unit 420 enters the transmission loop again to emit the detection signal, in S370. The emitting number is greater than two or equal to two.

Figure 4A:
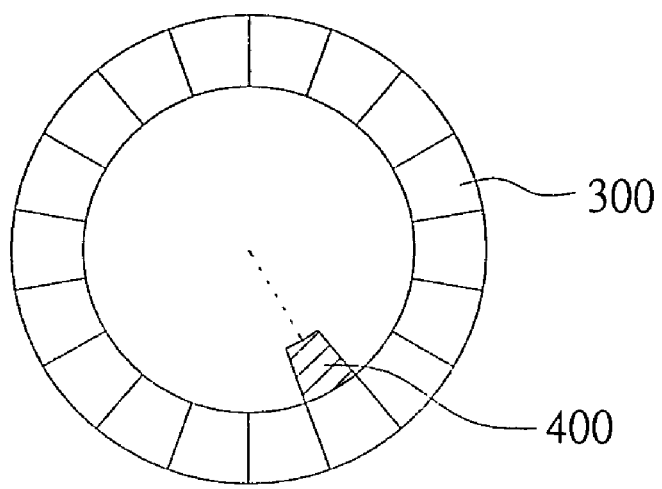
FIGS. 4A~4C are schematic diagrams of the emitting location of the detection unit of the present invention.
Figure 4B:
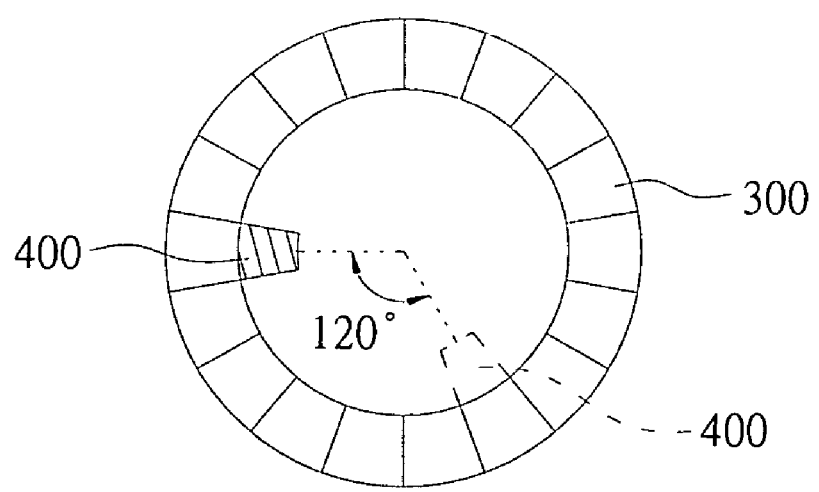
Figure 4C:
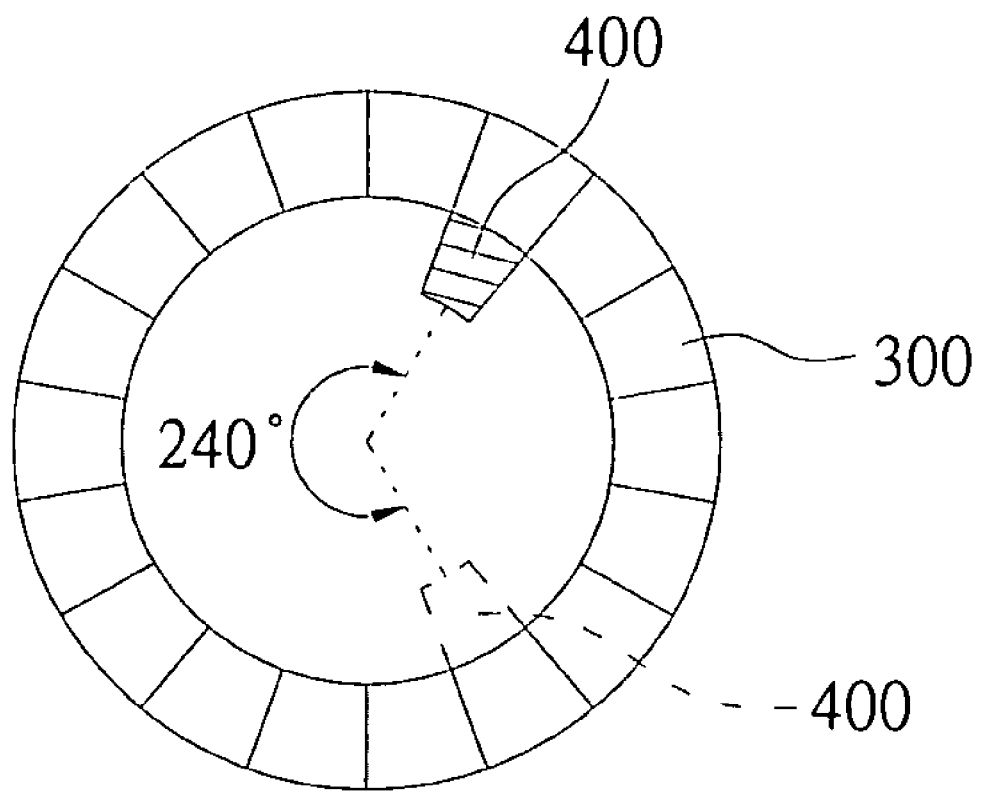

In order to illustrate the present invention clearly, the acceleration of the vehicle system 10 supposes to 80 g. Then, the speed of the vehicle system 10 being 80 kilometers per hour is calculated from the acceleration of the vehicle system 10 and the operation time of one tire rotation is 91 µs. If the tire detection signal is emitted three times when the tire rotates once, the operation time is divided into three equal periods. This means the time for emitting the tire detection signal via the detection unit 400 adds the delay time of 30 µs. When it takes 10 µs to emit the tire detection signal via the detection unit 400, the delay time is 20 µs, in S330. After the first processing unit 420 generates tire detection signals and the delay time—20 µs, the method enters a transmission loop to emit the first tire detection signal via the signal transmitting terminal 430, in S340. In the transmission loop, the first processing unit 420 emits the first tire detection signal at the first emitting location (as shown in FIG. 4A). The first processing unit 420 automatically delays a delay period—20 µs after the first tire detection signal is emitted. Next, the first processing unit 420 emits a second tire detection signal to the signal receiving terminal 210 of the receiving unit 200, as shown in FIG. 4B, the angle between the second emitting location and the first emitting location is 120 degrees. The signal transmitting terminal 430 delays a delay period—20 µs after the second tire detection signal is emitted from the detection unit 400 and emits a third tire detection signal, as shown in FIG. 4C, the angle between the third emitting location and the first emitting location is 240 degrees. When the detection unit 400 emits the third tire detection signal, the emitting operation ends, as steps from S350 to S370.

Therefore, the percentage of successfully received tire detection signals received by the receiving unit 200 is increased. The number of emitted tire detection signals emitted from the detection unit is limited to a specified value so as to increase the usage life of the battery (not shown in the figure) in the detection unit 400. Furthermore, because the delay time is changed as the speed of the vehicle system 10 changes, the time interval for emitting the tire detection signals is more flexible to fit with the speed of the vehicle system 10.

The present invention has the following characteristics:

1. The method utilizes acceleration to calculate the delay time for emitting tire detection signals from the detection unit so as to increase the percentage of successfully received tire detection signals received by the receiving unit.

2. The method avoids the angle and the location that cannot receive exactly tire detection signals, without emitting tire detection signals repeatedly, to reduce the power consumption of the battery.

3. When the speed of the tire rotation becomes faster or slower, the method still can avoid the angle and the location that cannot receive exactly tire detection signals to increase the percentage of successfully received tire detection signals received by the receiving unit.

4. Because the delay time changes as the speed of the vehicle system changes, the time interval for emitting the tire detection signals is more flexible to fit the speed of the vehicle system.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A wireless transmission method for tire detection signals, comprising:
   providing at least one a detection unit on a tire of a vehicle system for detecting acceleration values of the tire and values of at least one other status signal of the tire during rotation thereof;
   calculating a velocity value from detected acceleration values;
   calculating an operation time for one tire rotation according to the velocity value during each tire rotation;
   dividing the operation time into a multiplicity of equal time periods; and
   repeatedly emitting a value of the at least one other status signal to a receiving unit in the vehicle system via a wireless transmission method during each tire rotation, the repeated emissions being at each of the equal time periods.

2. The wireless transmission method for tire detection signals as claimed in claim 1, wherein the operation time is divided by a value that is greater than or equal to two.

3. The wireless transmission method for tire detection signals as claimed in claim 1, wherein the detection unit comprises a detector set, a first processing unit, and a signal transmitting terminal.

4. The wireless transmission method for tire detection signals as claimed in claim 3, wherein the first processing unit processes the acceleration values to generate the velocity value and determine the multiplicity of equal time periods.

5. The wireless transmission method for tire detection signals as claimed in claim 3, wherein the signal transmitting terminal emits the value of the at least one other status signal via a wireless transmission method to the receiving unit.

6. The wireless transmission method for tire detection signals as claimed in claim 3, wherein the detector set comprises a first detector and a second detector.

7. The wireless transmission method for tire detection signals as claimed in claim 6, wherein the first detector is a tire pressure detector for detecting a pressure value of the tire as the tire is rotated.

8. The wireless transmission method for tire detection signals as claimed in claim 6, wherein the second detector is an acceleration detector for detecting the acceleration values as the tire is rotated.

9. The wireless transmission method for tire detection signals as claimed in claim 3, wherein the receiving unit comprises a signal receiving terminal, a second processing unit, and a display unit.

10. The wireless transmission method for tire detection signals as claimed in claim 9, wherein the signal receiving terminal receives the value of the at least one other status signal transmitted from the detection unit and transmits the value of the at least one other status signal to the second processing unit.

11. The wireless transmission method for tire detection signals as claimed in claim 9, wherein the second processing unit is used for processing the value of the at least one other status signal to generate a data signal.

12. The wireless transmission method for tire detection signals as claimed in claim 11, wherein the display unit receives the data signal input from the second processing unit and displays the data signal.

* * * * *